(12) United States Patent
Liu et al.

(10) Patent No.: US 11,826,880 B2
(45) Date of Patent: Nov. 28, 2023

(54) DOUBLE-STATION WHEEL DEBURRING DEVICE

(71) Applicant: CITIC Dicastal Co., LTD, Qinhuangdao (CN)

(72) Inventors: Huiying Liu, Qinhuangdao (CN); Yudong Li, Qinhuangdao (CN)

(73) Assignee: CITIC Dicastal Co., LTD, Qinhuangdao (CN)

( * ) Notice: Subject to any disclaimer, the term of this patent is extended or adjusted under 35 U.S.C. 154(b) by 1020 days.

(21) Appl. No.: 16/711,426

(22) Filed: Dec. 12, 2019

(65) Prior Publication Data

US 2020/0306917 A1 Oct. 1, 2020

(30) Foreign Application Priority Data

Mar. 26, 2019 (CN) .......................... 201910232035.0

(51) Int. Cl.
*B24B 5/44* (2006.01)
*B24B 41/06* (2012.01)
(Continued)

(52) U.S. Cl.
CPC .................. *B24B 5/44* (2013.01); *B24B 5/01* (2013.01); *B24B 41/06* (2013.01); *B24B 5/08* (2013.01)

(58) Field of Classification Search
CPC ......... B24B 5/44; B24B 41/06; B24B 41/067; B24B 41/005; B24B 41/02;
(Continued)

(56) References Cited

U.S. PATENT DOCUMENTS

| 5,890,952 A * | 4/1999 | Beaupre .................... B23Q 3/18 451/168 |
| 9,725,252 B2 * | 8/2017 | Starz ........................ B60B 30/06 |
| 2016/0236459 A1 * | 8/2016 | Xue .......................... B41F 17/14 |

FOREIGN PATENT DOCUMENTS

| CN | 107030562 A | * | 8/2017 | ............. B24B 19/28 |
| CN | 107309441 A | * | 11/2017 | ............... B23B 5/16 |

(Continued)

OTHER PUBLICATIONS

CN107363669A EspaceNet Translation (Year: 2017).*

(Continued)

*Primary Examiner* — Joel D Crandall
*Assistant Examiner* — Makena S Markman
(74) *Attorney, Agent, or Firm* — Yong Chen

(57) ABSTRACT

The disclosure discloses a double-station wheel deburring device consisting of two major systems. One is a wheel double-station exchange system responsible for feeding and discharging of two wheels, switching between a first working table and a second working table, switching between an upper station and a lower station, and rotation of the wheels. The other is a cutter feeding system responsible for feeding of a rim deburring blade, a riser deburring blade and brushes. The device can simultaneously remove burrs on outer rims, risers and valve holes of two wheels. Through the interactive double-station working tables, the feeding and discharging operation and the deburring operation are simultaneously carried out at separate stations. The device can be applied to deburring of wheels of different specifications. The disclosure also discloses a double-station wheel deburring method.

6 Claims, 5 Drawing Sheets

(51) Int. Cl.
 *B24B 5/01* (2006.01)
 *B24B 5/08* (2006.01)
(58) Field of Classification Search
 CPC . B24B 27/0076; B24B 27/0023; B24B 19/28; B24B 9/00; B60B 2310/612; B60B 2310/234; B60B 30/06
 See application file for complete search history.

(56) References Cited

FOREIGN PATENT DOCUMENTS

| | | | | |
|---|---|---|---|---|
| CN | 107322387 A | * | 11/2017 | ......... B24B 27/0023 |
| CN | 107363669 A | * | 11/2017 | ............... B23C 3/04 |

OTHER PUBLICATIONS

CN-107309441-A EspaceNet Translation (Year: 2017).*
CN-107322387-A EspaceNet Translation (Year: 2017).*
CN-107030562-A EspaceNet Translation (Year: 2017).*

* cited by examiner

DOUBLE-STATION WHEEL DEBURRING DEVICE

CROSS-REFERENCE TO RELATED APPLICATIONS

The present application claims the priority of Chinese patent application No. 201910232035.0, filed on Mar. 26, 2019, which is hereby incorporated by reference in its entirety.

TECHNICAL FIELD

The disclosure relates to the technical field of machined wheel deburring, in particular to an interactive double-station wheel deburring device.

BACKGROUND

Burrs on key parts of a machined wheel need to be removed, so as to reduce corrosion risks and improve film uniformity. High-efficiency deburring equipment is becoming more and more popular in production. High-efficiency deburring can greatly improve deburring efficiency, increase yield and reduce production cost. Based on the present situation, the present disclosure provides a double-station wheel deburring device. Through interactive double-station working tables, the feeding and discharging operation and the deburring operation are simultaneously carried out at separate stations, thus integrating and compressing takt time and improving production efficiency.

SUMMARY

The disclosure aims to provide a double-station wheel deburring device, which can simultaneously remove burrs on the outer rims, risers and valve holes of two wheels. Through interactive double-station working tables, the feeding and discharging operation and the deburring operation are simultaneously carried out at separate stations, thus integrating and compressing takt time and improving production efficiency.

In order to achieve the above purpose, the technical solution of the disclosure is as follows: The specific details and working conditions of the equipment provided by the present disclosure will be described below in conjunction with the accompanying drawings.

A double-station wheel deburring device comprises a base, an interactive motor, a bearing seat, a bearing, a shaft, a rotating table, a first servo motor, a shaft A, a first working table, an upper-station motor, a first shaft, an upper-station chuck, first swing clamp cylinder pressure claws, first end-face blocks, a first mandrel base, a first mandrel, a lower-station motor, a second shaft, a lower-station chuck, a second mandrel base, second end-face blocks, second swing clamp cylinder pressure claws, a second mandrel, a left upper circumferential positioning rod, a second servo motor, a shaft B, a second working table, a right upper circumferential positioning rod, a right lower circumferential positioning rod, a first cylinder, first guide rails, a first slider, first guide pillars, an upper cylinder, an upper platform, a first motor, a first rotating shaft, a first brush, a second cylinder, second guide rails, a second slider, second guide pillars, a lower cylinder, a lower platform, a second motor, a second rotating shaft, a second brush, a horizontal cylinder, horizontal guide pillars, a horizontal moving platform, a first adjusting cylinder, a first sliding table, a first extension rod, a rim deburring blade, a second adjusting cylinder, a second sliding table, a second extension rod and a riser deburring blade. These components may be divided into two major systems. One is a wheel double-station exchange system responsible for feeding and discharging of two wheels, switching between the first working table and the second working table, switching between an upper station and a lower station, and rotation of the wheels. The other is a cutter feeding system responsible for feeding of the rim deburring blade, the riser deburring blade and the brushes. Through the coordination of the wheel double-station exchange system and the cutter feeding system, deburring of the two wheels can be completed at the same time with extremely high efficiency.

The interactive motor is installed on the base, an output end of the interactive motor is connected with the rotating table, and the rotation of the rotating table is controlled by the interactive motor. The left side of the rotating table is provided with the first servo motor, an output end of the first servo motor is connected with the shaft A, the shaft A is connected with the first working table, the rotation of the first working table may be controlled by the first servo motor, and the first working table is provided with a left upper station and a left lower station, which are both feeding areas. The left upper station consists of the upper-station motor, the first shaft, the upper-station chuck, the first swing clamp cylinder pressure claws, the first end-face blocks, the first mandrel base, the first mandrel and the left upper circumferential positioning rod. The rotation of the upper-station chuck may be controlled by the upper-station motor, the three first end-face blocks may axially position the wheels, the first mandrel may radially position the wheels, the left upper circumferential positioning rod may circumferentially position a valve hole of each wheel, from the top view of the device, a valve hole at the left upper station is positioned in the vertical upward direction, and the three first swing clamp cylinder pressure claws may clamp the wheels. The left lower station consists of the lower-station motor, the second shaft, the lower-station chuck, the second mandrel base, the second end-face blocks, the second swing clamp cylinder pressure claws, the second mandrel and the left lower circumferential positioning rod. The rotation of the lower-station chuck may be controlled by the lower-station motor, the three second end-face blocks may axially position the wheels, the second mandrel may radially position the wheels, the left lower circumferential positioning rod may circumferentially position a valve hole of each wheel, and from the top view of the device, a valve hole at the left lower station is positioned in the vertical downward direction, and the three second swing clamp cylinder pressure claws may clamp the wheels. The first working table is driven by the first servo motor to rotate by 180 degrees to control the cyclic switching between the left upper station and the left lower station. Since the valve hole at the left upper station and the valve hole at the left lower station are symmetrical about the origin, the wheel valve hole at the upper portion is always in the vertical upward direction and the wheel valve hole at the lower portion is always in the vertical downward direction during the cyclic switching process. Feeding and discharging of the two wheels can be completed simultaneously through the left upper station and the left lower station. The second servo motor symmetric to the first servo motor is installed on the right side of the rotating table, an output end of the second servo motor is connected with the shaft B, and the shaft B is connected with the second working table. The rotation of the second working table may be controlled by the second servo motor, and the second working table is provided with a right upper station and a right lower station, both of which are deburring areas. The parts of the right upper station and the right lower station are the same as the parts of the left upper station and the left lower station, but the positions of the circumferential positioning rods are different. From the top view of the device, the wheel valve hole at the right upper station may be positioned in the vertical downward direction by the right upper circumferential positioning rod, and the wheel valve hole at the right lower station may be positioned in the vertical upward direction by the right lower circumferential positioning rod. When the interactive motor drives the rotating table to rotate by 180 degrees, the first working table and the second working table are switched. Since the valve hole at the right upper station, the valve hole at the left upper station, the valve hole at the right lower station and the valve hole at the left lower station are symmetrical about the origin, during cyclic switching between the first working table and the second working table, the positions of the wheel valve holes at the left station are fixed, the wheel valve hole at the left upper station is always in the vertical upward direction, and the wheel valve hole at the lower left station is always in the vertical downward direction. The positions of the wheel valve holes at the right station are also fixed, the wheel valve hole at the right upper station is always in the vertical downward direction, and the wheel valve hole at the right lower station is always in the vertical upward direction. This is the wheel double-station exchange system, which can complete feeding and discharging of the two wheels, switching between the first working table and the second working table, switching between the upper station and the lower station, and rotation of the wheels.

A first valve hole deburring system is installed above the right upper station for deburring the wheel valve hole at the right upper station. An output end of the first cylinder is connected with the first slider, the first slider is installed on the first guide rails, and the first slider may be controlled by the first cylinder to move forward and backward in the radial direction of the wheels. The upper cylinder is mounted on the first slider, an output end of the upper cylinder is connected to the upper platform, and under the guidance of the first guide pillars, the upper cylinder controls the upper platform to move up and down. The first motor is installed on the upper platform, an output end of the first motor is equipped with the first brush, and the rotation of the first brush is controlled by the first motor. A second valve hole deburring system is installed below the right lower station for deburring the wheel valve hole at the right lower station. An output end of the second cylinder is connected with the second slider, the second slider is installed on the second guide rails, and the second slider may be controlled by the second cylinder to move forward and backward in the radial direction of the wheels. The lower cylinder is installed on the second slider, an output end of the lower cylinder is connected with the lower platform, and under the guidance of the second guide pillars, the lower cylinder controls the lower platform to move up and down. The second motor is installed on the lower platform, an output end of the second motor is equipped with the second brush, and the rotation of the second brush is controlled by the second motor. The second servo motor drives the second working table to rotate, and the rotation angle is the valve hole angle. After rotation, the axes of the wheel valve hole at the right upper station and the wheel valve hole at the right lower station both become vertical. Then the first cylinder is started to adjust the position of the first brush so that the first brush is located directly above the wheel valve hole at the right upper station; the second cylinder is started to adjust the position of the second brush so that the second brush is positioned directly below the wheel valve hole at the right lower station; then, the upper cylinder is started to drive the rotating first brush to deburr the wheel valve hole at the right upper station; at the same time, the lower cylinder is started to drive the rotating second brush to deburr the wheel valve hole at the right lower station, thus completing the deburring of the two wheel valve holes. A first riser and rim deburring cutter system is installed in front of the right station for riser and rim deburring at the right upper station. An output end of the horizontal cylinder is connected with the horizontal moving table. Under the guidance of the horizontal guide pillars, the horizontal cylinder controls the horizontal moving table to move forward and backward. The first adjusting cylinder is fixed on the horizontal moving table, an output end of the first adjusting cylinder is connected with the first sliding table, the first sliding table is installed on the guide rails, the first extension rod is fixed on the first sliding table, and the rim deburring blade is fixed on the first extension rod. The vertical position of the rim deburring blade may be adjusted by the first adjusting cylinder, so as to match the diameter of a wheel rim. The second adjusting cylinder is fixed on the horizontal moving table, an output end of the second adjusting cylinder is connected with the second sliding table, the second sliding table is installed on the guide rails, the second extension rod is fixed on the second sliding table, and the riser deburring blade is fixed on the second extension rod. The vertical position of the riser deburring blade may be adjusted by the second adjusting cylinder, so as to match the diameter of a wheel riser. When different wheels are deburred, the corresponding first and second extension rods and may be used, so that the operation is flexible and convenient. A second riser and rim deburring cutter system symmetric to the first riser and rim deburring cutter system is installed behind the right station for riser and rim deburring at the right lower station. The second riser and rim deburring cutter system is the same as the first riser and rim deburring cutter system. After valve hole deburring at the right upper station and the right lower station, the second servo motor drives the second working table to rotate again, so that the wheels at the right upper station and the right lower station are both in a horizontal position, then the motors at the right upper station and the right lower station are started to respectively drive the wheels at the right upper station and the right lower station to rotate, and then the front and back horizontal cylinders are started at the same time to drive the rim deburring blade and the riser deburring blade to be fed, thus completing the riser and rim deburring of two wheels at the same time. This is the cutter feeding system, which completes the feeding of the first brush, the second brush, the rim deburring blade and the riser deburring blade. Through the coordination of the wheel double-station exchange system and the cutter feeding system, deburring of two wheels can be completed at the same time with extremely high efficiency.

The working process of a double-station wheel deburring device includes the following steps: firstly, the first wheel is loaded to a left upper station by a manipulator, and clamped by first swing clamp cylinder pressure claws; then the first servo motor is started to drive a first working table to rotate by 180 degrees, a left lower station is switched to the upper portion, and then the second wheel is loaded by the manipulator and clamped by second swing clamp cylinder pressure claws. At this point, the feeding of two wheels is completed in the area on the left side of the device. Then an interactive motor is started to drive a rotating table to rotate by 180 degrees, the first working table and a second working table are switched, and the unloaded second working table is switched to the left side of the device and enters a feeding area, ready for the feeding of another two wheels. The loaded first working table is switched to the right side of the device, and enters a deburring area for deburring, a second servo motor drives the second working table to rotate, and the rotation angle is the valve hole angle; after rotation, the axes of a valve hole at the right upper station and a valve hole at the right lower station both become vertical. Then a first cylinder is started to adjust the position of a first brush so that the first brush is located directly above the wheel valve hole at the right upper station; a second cylinder is started to adjust the position of a second brush so that the second brush is positioned directly below the wheel valve hole at the right lower station; then, an upper cylinder is started to drive the rotating first brush to deburr the wheel valve hole at the right upper station; at the same time, a lower cylinder is started to drive the rotating second brush to deburr the wheel valve hole at the right lower station. At this point, valve hole deburring of two wheels is completed at the same time. After the wheels at the right upper station and the right lower station are subjected to valve hole deburring, the second servo motor drives the second working table to rotate again, so that the wheels at the right upper station and the right lower station are both in a horizontal position, then the motors at the right upper station and the right lower station are started to respectively drive the wheels at the right upper station and the right lower station to rotate, and then front and back horizontal cylinders are started at the same time to drive a rim deburring blade and a riser deburring blade to be fed, thus completing the riser and rim deburring of two wheels at the same time. After deburring of wheels at the right upper station and the right lower station is completed, the right upper station and the right lower station are restored to their original positions, and at the moment feeding of wheels is completed at the left upper station and the left lower station, then the interactive motor is started again to drive the rotating table to rotate by 180 degrees, the first working table and the second working table are switched again, and the newly loaded second working table is switched to the right side of the device and enters a deburring area for deburring of another two wheels. The first working table loaded with the deburred wheels is switched to the left side of the device and enters a feeding and discharging area, where wheels are discharged first and then fed. At this point, the device enters a stable cyclic operation state, the feeding and discharging takt on the left side of the device is matched with the deburring takt on the right side, and through the interactive double-station working tables, the feeding and discharging operation and the deburring operation are simultaneously carried out at separate stations, thus integrating and compressing takt time and greatly improving production efficiency.

The device can simultaneously remove burrs on the outer rims, risers and valve holes of two wheels. Through the interactive double-station working tables, the feeding and discharging operation and the deburring operation are simultaneously carried out at separate stations, the design is ingenious, the conception is novel, and the universality is high. The device can be applied to deburring of wheels of different specifications with short takt time and high efficiency, and has high practical production and application value.

Figure 1:
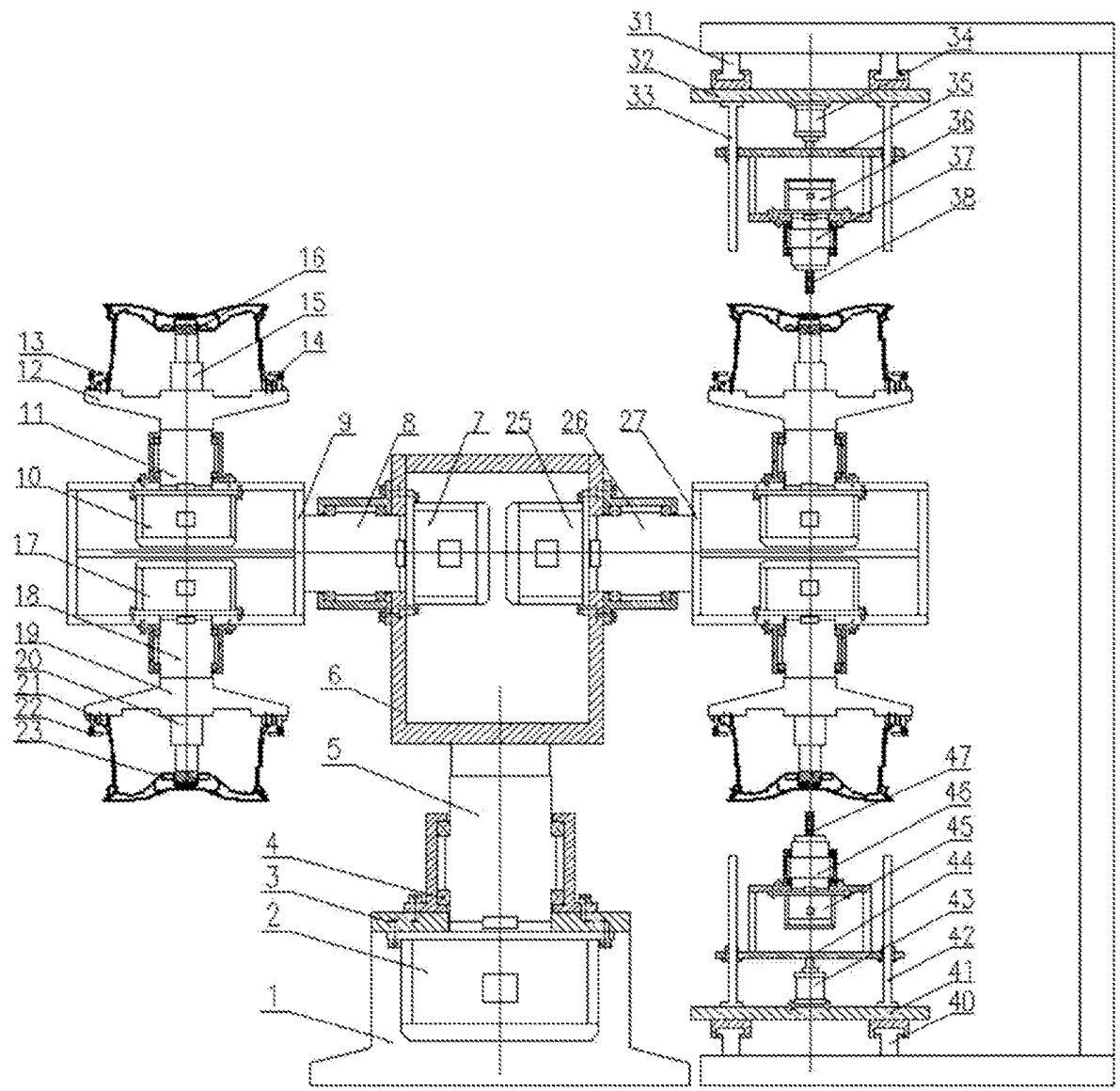
FIG. 1 is a front view of a double-station wheel deburring device according to the present disclosure.
Figure 2:
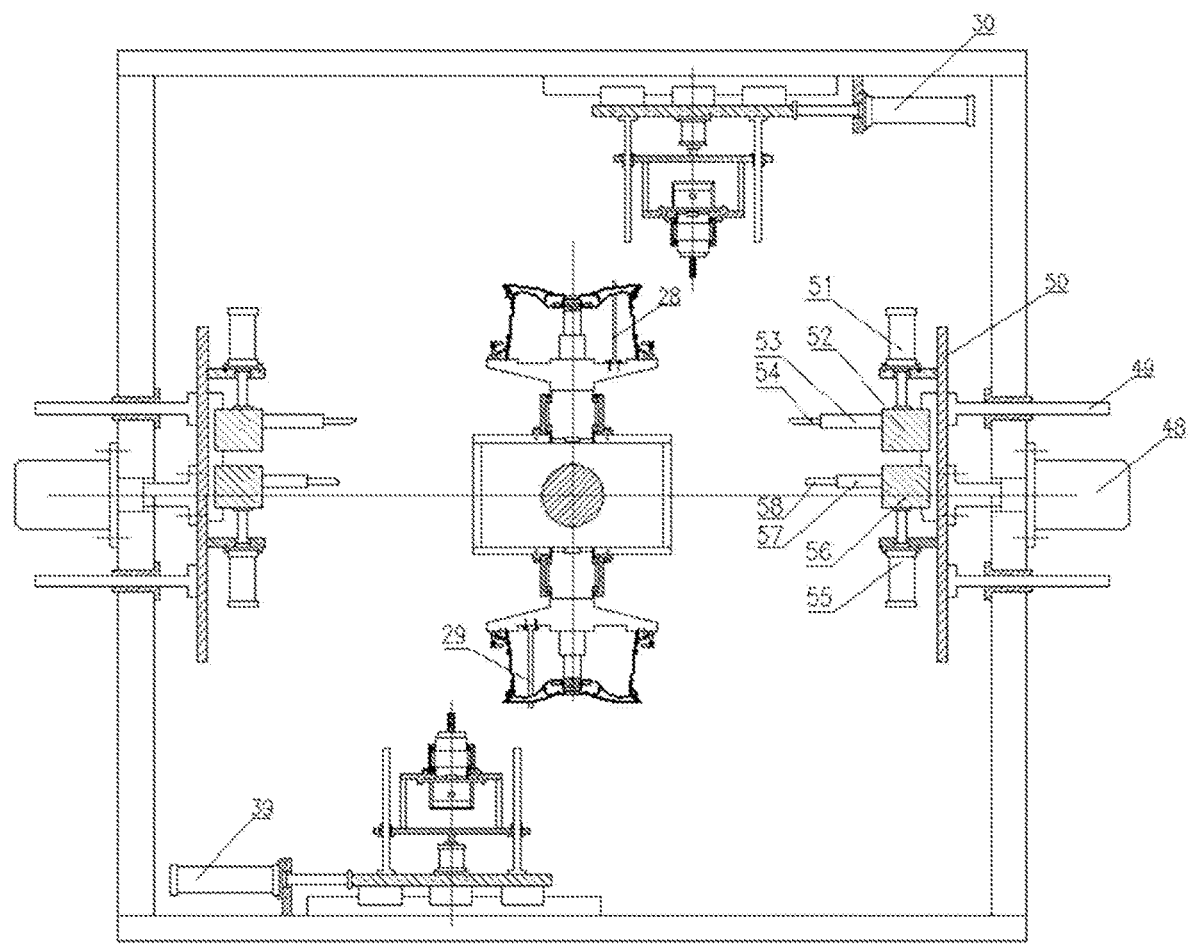
FIG. 2 is a left view of a double-station wheel deburring device according to the present disclosure.
Figure 3:
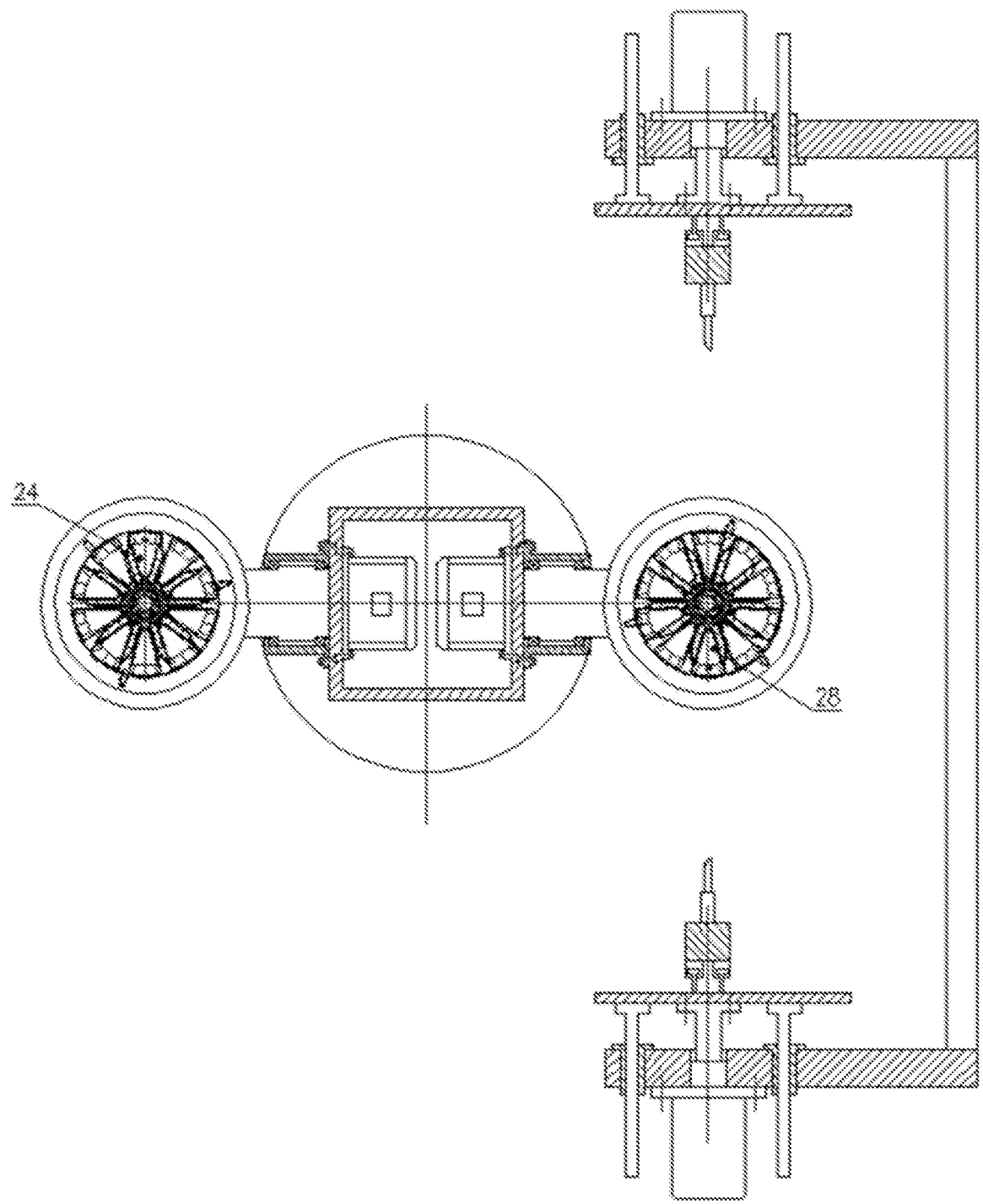
FIG. 3 is a top view of a double-station wheel deburring device according to the present disclosure.
Figure 4:
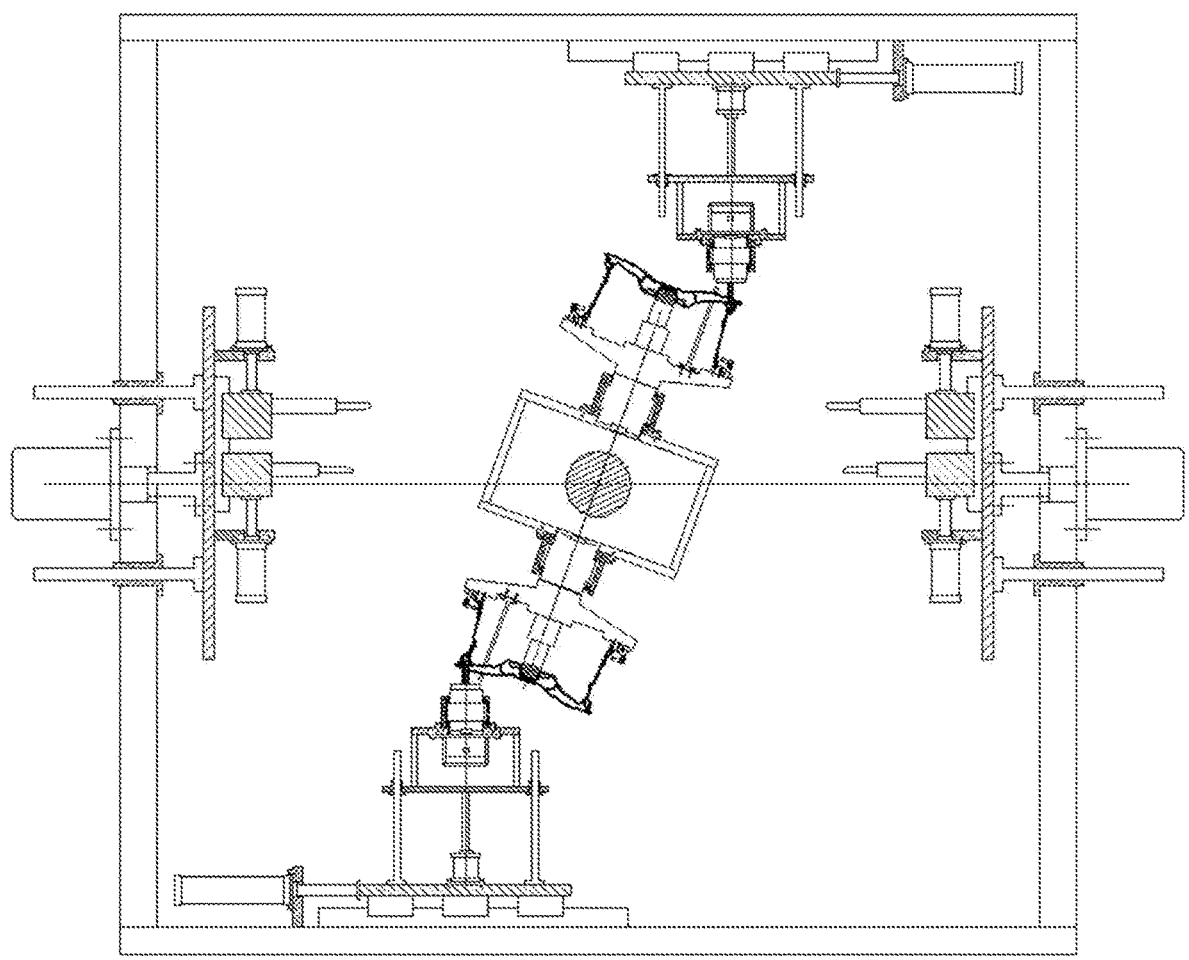
FIG. 4 is a schematic view of valve hole deburring of a double-station wheel deburring device according to the present disclosure.
Figure 5:
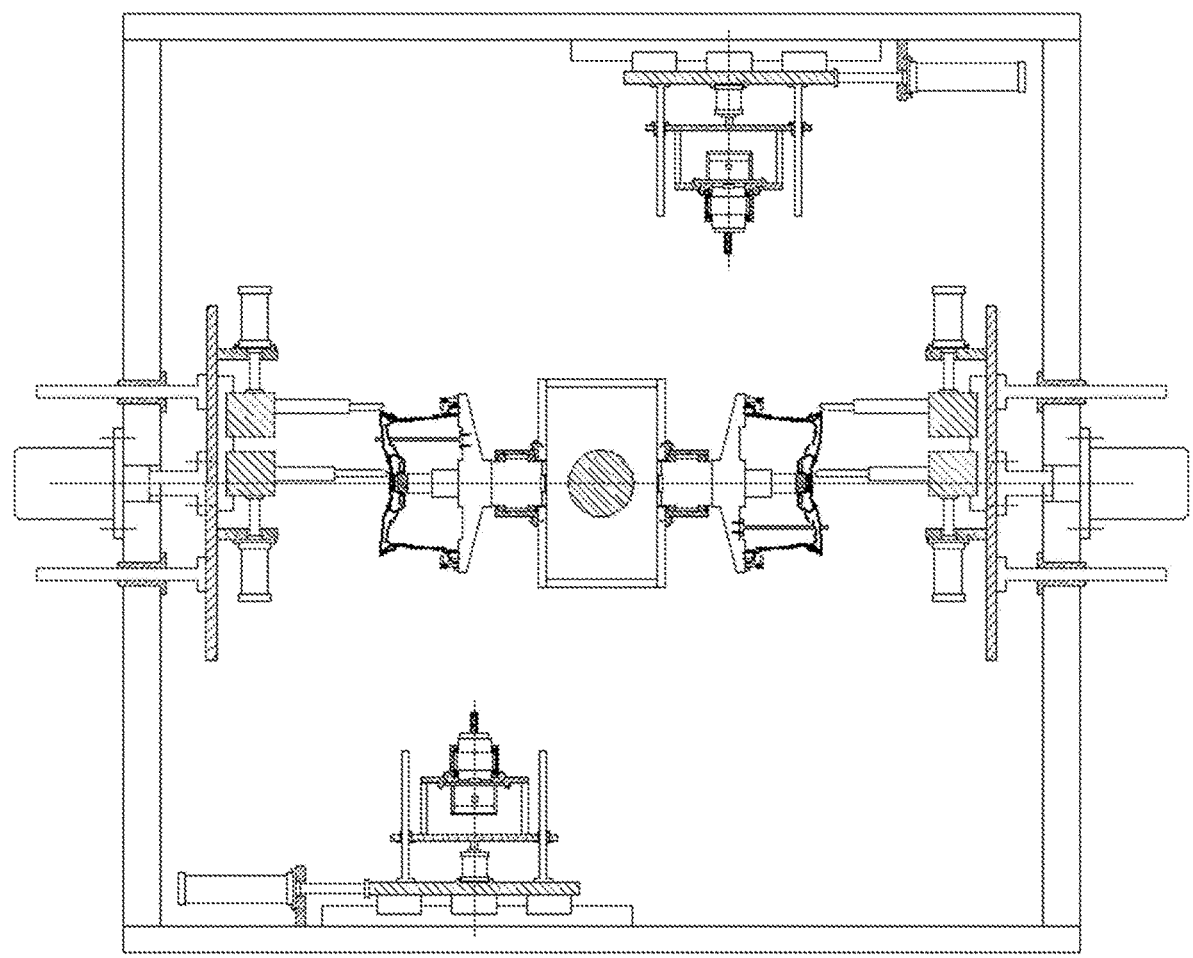
FIG. 5 is a schematic view of riser and rim deburring of a double-station wheel deburring device according to the present disclosure.

In the drawings, 1—base, 2—interactive motor, 3—bearing seat, 4—bearing, 5—shaft, 6—rotating table, 7—first servo motor, 8—shaft A, 9—first working table, 10—upper-station motor, 11—first shaft, 12—upper-station chuck, 13—first swing clamp cylinder pressure claw, 14—first end-face block, 15—first mandrel base, 16—first mandrel, 17—lower working motor, 18—second shaft, 19—lower-station chuck, 20—second mandrel base, 21—second end-face block, 22—second swing clamp cylinder pressure claw, 23—second mandrel, 24—left upper circumferential positioning rod, 25—second servo motor, 26—shaft B, 27—second working table, 28—right upper circumferential positioning rod, 29—right lower circumferential positioning rod, 30—first cylinder, 31—first guide rail, 32—first slider, 33—first guide pillar, 34—upper cylinder, 35—upper platform, 36—first motor, 37—first rotating shaft, 38—first brush, 39—second cylinder, 40—second guide rail, 41—second slider, 42—second guide pillar, 43—lower cylinder, 44—lower platform, 45—second motor, 46—second rotating shaft, 47—second brush, 48—horizontal cylinder, 49—horizontal guide pillar, 50—horizontal moving platform, 51—first adjusting cylinder, 52—first sliding table, 53—first extension rod, 54—rim deburring blade, 55—second adjusting cylinder, 56—second sliding table, 57—second extension rod, 58—riser deburring blade.

DETAILED DESCRIPTION

The specific details and working conditions of the equipment provided by the present disclosure will be described below in conjunction with the accompanying drawings.

A double-station wheel deburring device comprises a base 1, an interactive motor 2, a bearing seat 3, a bearing 4, a shaft 5, a rotating table 6, a first servo motor 7, a shaft A 8, a first working table 9, an upper-station motor 10, a first shaft 11, an upper-station chuck 12, first swing clamp cylinder pressure claws 13, first end-face blocks 14, a first mandrel base 15, a first mandrel 16, a lower-station motor 17, a second shaft 18, a lower-station chuck 19, a second mandrel base 20, second end-face blocks 21, second swing clamp cylinder pressure claws 22, a second mandrel 23, a left upper circumferential positioning rod 24, a second servo motor 25, a shaft B 26, a second working table 27, a right upper circumferential positioning rod 28, a right lower circumferential positioning rod 29, a first cylinder 30, first guide rails 31, a first slider 32, first guide pillars 33, an upper cylinder 34, an upper platform 35, a first motor 36, a first rotating shaft 37, a first brush 38, a second cylinder 39, second guide rails 40, a second slider 41, second guide pillars 42, a lower cylinder 43, a lower platform 44, a second motor 45, a second rotating shaft 46, a second brush 47, a horizontal cylinder 48, horizontal guide pillars 49, a horizontal moving platform 50, a first adjusting cylinder 51, a first sliding table 52, a first extension rod 53, a rim deburring blade 54, a second adjusting cylinder 55, a second sliding table 56, a second extension rod 57 and a riser deburring blade 58. These components may be divided into two major systems.

One is a wheel double-station exchange system responsible for feeding and discharging of two wheels, switching between the first working table and the second working table, switching between an upper station and a lower station, and rotation of the wheels. The other is a cutter feeding system responsible for feeding of the rim deburring blade, the riser deburring blade and the brushes. Through the coordination of the wheel double-station exchange system and the cutter feeding system, deburring of the two wheels can be completed at the same time with extremely high efficiency.

The interactive motor 2 is installed on the base 1, an output end of the interactive motor 2 is connected with the rotating table 6, and the rotation of the rotating table 6 is controlled by the interactive motor 2. The left side of the rotating table 6 is provided with the first servo motor 7, an output end of the first servo motor 7 is connected with the shaft A 8, the shaft A 8 is connected with the first working table 9, the rotation of the first working table 9 may be controlled by the first servo motor 7, and the first working table 9 is provided with a left upper station and a left lower station, which are both feeding areas. The left upper station consists of the upper-station motor 10, the first shaft 11, the upper-station chuck 12, the first swing clamp cylinder pressure claws 13, the first end-face blocks 14, the first mandrel base 15, the first mandrel 16 and the left upper circumferential positioning rod 24. The rotation of the upper-station chuck 12 may be controlled by the upper-station motor 10, the three first end-face blocks 14 may axially position the wheels, the first mandrel 16 may radially position the wheels, the left upper circumferential positioning rod 24 may circumferentially position a valve hole of each wheel, from the top view of the device, a valve hole at the left upper station is positioned in the vertical upward direction, and the three first swing clamp cylinder pressure claws 13 may clamp the wheels. The left lower station consists of the lower-station motor 17, the second shaft 18, the lower-station chuck 19, the second mandrel base 20, the second end-face blocks 21, the second swing clamp cylinder pressure claws 22, the second mandrel 23 and the left lower circumferential positioning rod. The rotation of the lower-station chuck 19 may be controlled by the lower-station motor 17, the three second end-face blocks 21 may axially position the wheels, the second mandrel 23 may radially position the wheels, the left lower circumferential positioning rod may circumferentially position a valve hole of each wheel, and from the top view of the device, a valve hole at the left lower station is positioned in the vertical downward direction, and the three second swing clamp cylinder pressure claws 22 may clamp the wheels. The first working table 9 is driven by the first servo motor 7 to rotate by 180 degrees to control the cyclic switching between the left upper station and the left lower station. Since the valve hole at the left upper station and the valve hole at the left lower station are symmetrical about the origin, the wheel valve hole at the upper portion is always in the vertical upward direction and the wheel valve hole at the lower portion is always in the vertical downward direction during the cyclic switching process. Feeding and discharging of the two wheels can be completed simultaneously through the left upper station and the left lower station. The second servo motor 25 symmetric to the first servo motor 7 is installed on the right side of the rotating table 6, an output end of the second servo motor 25 is connected with the shaft B 26, and the shaft B 26 is connected with the second working table 27. The rotation of the second working table 27 may be controlled by the second servo motor 25, and the second working table 27 is provided with a right upper station and a right lower station, both of which are deburring areas. The parts of the right upper station and the right lower station are the same as the parts of the left upper station and the left lower station, but the positions of the circumferential positioning rods are different. From the top view of the device, the wheel valve hole at the right upper station may be positioned in the vertical downward direction by the right upper circumferential positioning rod 28, and the wheel valve hole at the right lower station may be positioned in the vertical upward direction by the right lower circumferential positioning rod 29. When the interactive motor 2 drives the rotating table to rotate by 180 degrees, the first working table 9 and the second working table 27 are switched. Since the valve hole at the right upper station, the valve hole at the left upper station, the valve hole at the right lower station and the valve hole at the left lower station are symmetrical about the origin, during cyclic switching between the first working table 9 and the second working table 27, the positions of the wheel valve holes at the left station are fixed, the wheel valve hole at the left upper station is always in the vertical upward direction, and the wheel valve hole at the lower left station is always in the vertical downward direction. The positions of the wheel valve holes at the right station are also fixed, the wheel valve hole at the right upper station is always in the vertical downward direction, and the wheel valve hole at the right lower station is always in the vertical upward direction. This is the wheel double-station exchange system, which can complete feeding and discharging of the two wheels, switching between the first working table and the second working table, switching between the upper station and the lower station, and rotation of the wheels.

A first valve hole deburring system is installed above the right upper station for deburring the wheel valve hole at the right upper station. An output end of the first cylinder 30 is connected with the first slider 32, the first slider 32 is installed on the first guide rails 31, and the first slider 32 may be controlled by the first cylinder 30 to move forward and backward in the radial direction of the wheels. The upper cylinder 34 is mounted on the first slider 32, an output end of the upper cylinder 34 is connected to the upper platform 35, and under the guidance of the first guide pillars 33, the upper cylinder 34 controls the upper platform 35 to move up and down. The first motor 36 is installed on the upper platform 35, an output end of the first motor 36 is equipped with the first brush 38, and the rotation of the first brush 38 is controlled by the first motor 36. A second valve hole deburring system is installed below the right lower station for deburring the wheel valve hole at the right lower station. An output end of the second cylinder 39 is connected with the second slider 41, the second slider 41 is installed on the second guide rails 40, and the second slider 41 may be controlled by the second cylinder 39 to move forward and backward in the radial direction of the wheels. The lower cylinder 43 is installed on the second slider 41, an output end of the lower cylinder 43 is connected with the lower platform 44, and under the guidance of the second guide pillars 42, the lower cylinder 43 controls the lower platform 44 to move up and down. The second motor 45 is installed on the lower platform 44, an output end of the second motor 45 is equipped with the second brush 47, and the rotation of the second brush 47 is controlled by the second motor 45. The second servo motor 25 drives the second working table 27 to rotate, and the rotation angle is the valve hole angle. After rotation, the axes of the wheel valve hole at the right upper station and the wheel valve hole at the right lower station both become vertical. Then the first cylinder 30 is started to adjust the position of the first brush 38 so that the first brush 38 is located directly above the wheel valve hole at the right upper station; the second cylinder 39 is started to adjust the position of the second brush 47 so that the second brush 47 is positioned directly below the wheel valve hole at the right lower station; then, the upper cylinder 34 is started to drive the rotating first brush 38 to deburr the wheel valve hole at the right upper station; at the same time, the lower cylinder 43 is started to drive the rotating second brush 47 to deburr the wheel valve hole at the right lower station, thus completing the deburring of the two wheel valve holes. A first riser and rim deburring cutter system is installed in front of the right station for riser and rim deburring at the right upper station. An output end of the horizontal cylinder 48 is connected with the horizontal moving table 50. Under the guidance of the horizontal guide pillars 49, the horizontal cylinder 48 controls the horizontal moving table 50 to move forward and backward. The first adjusting cylinder 51 is fixed on the horizontal moving table 50, an output end of the first adjusting cylinder 51 is connected with the first sliding table 52, the first sliding table 52 is installed on the guide rails, the first extension rod 53 is fixed on the first sliding table 52, and the rim deburring blade 54 is fixed on the first extension rod 53. The vertical position of the rim deburring blade 54 may be adjusted by the first adjusting cylinder 51, so as to match the diameter of a wheel rim. The second adjusting cylinder 55 is fixed on the horizontal moving table 50, an output end of the second adjusting cylinder 55 is connected with the second sliding table 56, the second sliding table 56 is installed on the guide rails, the second extension rod 57 is fixed on the second sliding table 56, and the riser deburring blade 58 is fixed on the second extension rod 57. The vertical position of the riser deburring blade 58 may be adjusted by the second adjusting cylinder 55, so as to match the diameter of a wheel riser. When different wheels are deburred, the corresponding first and second extension rods 53 and 57 may be used, so that the operation is flexible and convenient. A second riser and rim deburring cutter system symmetric to the first riser and rim deburring cutter system is installed behind the right station for riser and rim deburring at the right lower station. The second riser and rim deburring cutter system is the same as the first riser and rim deburring cutter system. After valve hole deburring at the right upper station and the right lower station, the second servo motor 25 drives the second working table 27 to rotate again, so that the wheels at the right upper station and the right lower station are both in a horizontal position, then the motors at the right upper station and the right lower station are started to respectively drive the wheels at the right upper station and the right lower station to rotate, and then the front and back horizontal cylinders 48 are started at the same time to drive the rim deburring blade 54 and the riser deburring blade 58 to be fed, thus completing the riser and rim deburring of two wheels at the same time. This is the cutter feeding system, which completes the feeding of the first brush 38, the second brush 47, the rim deburring blade 54 and the riser deburring blade 58. Through the coordination of the wheel double-station exchange system and the cutter feeding system, deburring of two wheels can be completed at the same time with extremely high efficiency.

The working process of a double-station wheel deburring device includes the following steps: firstly, the first wheel is loaded to a left upper station by a manipulator, and clamped by first swing clamp cylinder pressure claws 13; then the first servo motor 7 is started to drive a first working table 9 to rotate by 180 degrees, a left lower station is switched to the upper portion, and then the second wheel is loaded by the manipulator and clamped by second swing clamp cylinder pressure claws 22. At this point, the feeding of two wheels is completed in the area on the left side of the device. Then an interactive motor 2 is started to drive a rotating table 6 to rotate by 180 degrees, the first working table 9 and a second working table 27 are switched, and the unloaded second working table 27 is switched to the left side of the device and enters a feeding area, ready for the feeding of another two wheels. The loaded first working table 9 is switched to the right side of the device, and enters a deburring area for deburring, a second servo motor 25 drives the second working table 27 to rotate, and the rotation angle is the valve hole angle; after rotation, the axes of a valve hole at the right upper station and a valve hole at the right lower station both become vertical. Then a first cylinder 30 is started to adjust the position of a first brush 38 so that the first brush 38 is located directly above the wheel valve hole at the right upper station; a second cylinder 39 is started to adjust the position of a second brush 47 so that the second brush 47 is positioned directly below the wheel valve hole at the right lower station; then, an upper cylinder 34 is started to drive the rotating first brush 38 to deburr the wheel valve hole at the right upper station; at the same time, a lower cylinder 43 is started to drive the rotating second brush 47 to deburr the wheel valve hole at the right lower station. At this point, valve hole deburring of two wheels is completed at the same time. After the wheels at the right upper station and the right lower station are subjected to valve hole deburring, the second servo motor 25 drives the second working table 27 to rotate again, so that the wheels at the right upper station and the right lower station are both in a horizontal position, then the motors at the right upper station and the right lower station are started to respectively drive the wheels at the right upper station and the right lower station to rotate, and then front and back horizontal cylinders 48 are started at the same time to drive a rim deburring blade 54 and a riser deburring blade 58 to be fed, thus completing the riser and rim deburring of two wheels at the same time. After deburring of wheels at the right upper station and the right lower station is completed, the right upper station and the right lower station are restored to their original positions, and at the moment feeding of wheels is completed at the left upper station and the left lower station, then the interactive motor 2 is started again to drive the rotating table 6 to rotate by 180 degrees, the first working table 9 and the second working table 27 are switched again, and the newly loaded second working table 27 is switched to the right side of the device and enters a deburring area for deburring of another two wheels. The first working table 9 loaded with the deburred wheels is switched to the left side of the device and enters a feeding and discharging area, where wheels are discharged first and then fed. At this point, the device enters a stable cyclic operation state, the feeding and discharging takt on the left side of the device is matched with the deburring takt on the right side, and through the interactive double-station working tables, the feeding and discharging operation and the deburring operation are simultaneously carried out at separate stations, thus integrating and compressing takt time and greatly improving production efficiency.

The device can simultaneously remove burrs on the outer rims, risers and valve holes of two wheels. Through the interactive double-station working tables, the feeding and discharging operation and the deburring operation are simultaneously carried out at separate stations, the design is ingenious, the conception is novel, and the universality is high. The device can be applied to deburring of wheels of different specifications with short takt time and high efficiency, and has high practical production and application value.

What is claimed is:

1. A double-station wheel deburring device, comprising a base, an interactive motor, a bearing seat, a bearing, a shaft, a rotating table, a first servo motor, a shaft A, a first working table, an upper-station motor, a first shaft, an upper-station chuck, first swing clamp cylinder pressure claws, first end-face blocks, a first mandrel base, a first mandrel, a lower-station motor, a second shaft, a lower-station chuck, a second mandrel base, second end-face blocks, second swing clamp cylinder pressure claws, a second mandrel, a left upper circumferential positioning rod, a second servo motor, a shaft B, a second working table, a right upper circumferential positioning rod, a right lower circumferential positioning rod, a first cylinder, first guide rails, a first slider, first guide pillars, an upper cylinder, an upper platform, a first motor, a first rotating shaft, a first brush, a second cylinder, second guide rails, a second slider, second guide pillars, a lower cylinder, a lower platform, a second motor, a second rotating shaft, a second brush, a horizontal cylinder, horizontal guide pillars, a horizontal moving platform, a first adjusting cylinder, a first sliding table, a first extension rod, a rim deburring blade, a second adjusting cylinder, a second sliding table, a second extension rod, and a riser deburring blade, wherein the interactive motor is installed on the base, an output end of the interactive motor is connected with the rotating table, and the rotation of the rotating table is controlled by the interactive motor; the left side of the rotating table is provided with the first servo motor, an output end of the first servo motor is connected with the shaft A, the shaft A is connected with the first working table, the rotation of the first working table is controlled by the first servo motor, and the first working table is provided with a left upper station and a left lower station, wherein the left upper station and the left lower station are both feeding areas; and the first servo motor drives the first working table to rotate by 180 degrees to control a cyclic switching between the left upper station and the left lower station.

2. The double-station wheel deburring device according to claim 1, wherein the second servo motor symmetric to the first servo motor is installed on the right side of the rotating table, an output end of the second servo motor is connected with the shaft B, the shaft B is connected with the second working table, the rotation of the second working table is controlled by the second servo motor, and the second working table is provided with a right upper station and a right lower station, wherein the right upper station and the right lower station are both feeding areas; when the interactive motor drives the rotating table to rotate by 180 degrees, the first working table and the second working table are switched.

3. The double-station wheel deburring device according to claim 1, wherein a first valve hole deburring system is installed above the right upper station, and the first valve hole deburring system comprises: an output end of the first cylinder is connected with the first slider, the first slider is installed on the first guide rails, and the first slider is controlled by the first cylinder to move forward and backward in the radial direction of the wheels; the upper cylinder is mounted on the first slider, an output end of the upper cylinder is connected to the upper platform, and under the guidance of the first guide pillars, the upper cylinder controls the upper platform to move up and down; and the first motor is installed on the upper platform, an output end of the first motor is equipped with the first brush, and the rotation of the first brush is controlled by the first motor.

4. The double-station wheel deburring device according to claim 1, wherein a second valve hole deburring system is installed below the right lower station, and the second valve hole deburring system comprises: an output end of the second cylinder is connected with the second slider, the second slider is installed on the second guide rails, and the second slider is controlled by the second cylinder to move forward and backward in the radial direction of the wheels; the lower cylinder is installed on the second slider, an output end of the lower cylinder is connected with the lower platform, and under the guidance of the second guide pillars, the lower cylinder controls the lower platform to move up and down; and the second motor is installed on the lower platform, an output end of the second motor is equipped with the second brush, and the rotation of the second brush is controlled by the second motor.

5. The double-station wheel deburring device according to claim 1, wherein the second servo motor drives the second working table to rotate, and the rotation angle is the valve hole angle; a first riser and rim deburring cutter system is installed in front of the right station; and the first riser and rim deburring cutter system comprises: an output end of the horizontal cylinder is connected with the horizontal moving table, and under the guidance of the horizontal guide pillars, the horizontal cylinder controls the horizontal moving table to move forward and backward; the first adjusting cylinder is fixed on the horizontal moving table, an output end of the first adjusting cylinder is connected with the first sliding table, the first sliding table is installed on a third guide rails, the first extension rod is fixed on the first sliding table, and the rim deburring blade is fixed on the first extension rod; the vertical position of the rim deburring blade is adjusted by the first adjusting cylinder, so as to match the diameter of a wheel rim; and the second adjusting cylinder is fixed on the horizontal moving table, an output end of the second adjusting cylinder is connected with the second sliding table, the second sliding table is installed on a fourth guide rails, the second extension rod is fixed on the second sliding table, the riser deburring blade is fixed on the second extension rod, and the vertical position of the riser deburring blade is adjusted by the second adjusting cylinder, so as to match the diameter of a wheel riser.

6. The double-station wheel deburring device according to claim 5, wherein a second riser and rim deburring cutter system is installed behind the right station.

* * * * *